United States Patent [19]

Wayne

[11] 4,341,412

[45] Jul. 27, 1982

[54] TRUCK BED LINER

[76] Inventor: Michael Wayne, 1511 Ashover, Bloomfield Hills, Mich. 48013

[21] Appl. No.: 143,075

[22] Filed: Apr. 24, 1980

[51] Int. Cl.³ ............................................. B62D 33/00
[52] U.S. Cl. ................................. 296/39 R; 224/42.42
[58] Field of Search ............... 296/39 R; 220/72, 410; 224/42.42 R

[56] References Cited

U.S. PATENT DOCUMENTS

| | | | |
|---|---|---|---|
| 3,079,027 | 2/1963 | Edwards | 220/72 |
| 3,814,473 | 6/1974 | Lorenzen, Jr. | 296/39 R |
| 3,881,768 | 5/1975 | Nix | 296/39 R |
| 4,047,749 | 9/1977 | Lambitz et al. | 296/39 R |
| 4,111,481 | 9/1978 | Nix et al. | 296/39 R |
| 4,162,098 | 7/1979 | Richardson | 296/39 R |
| 4,245,863 | 1/1981 | Carter | 296/39 R |

Primary Examiner—Joseph F. Peters, Jr.
Assistant Examiner—Ross Weaver
Attorney, Agent, or Firm—Cullen, Sloman, Cantor, Grauer, Scott & Rutherford

[57] ABSTRACT

A one-piece truck bed liner is disclosed having its side walls formed in longitudinally extending stepped panels with riser and tread portions thereby defining substantially continuous horizontally disposed side rails for resisting bending stresses, cargo impact and frictional forces. The liner bottom and front walls are in ribbed form, connected by a transverse bend portion free of ribs, in a manner to avoid cargo impact to the bend area. The ribs in the liner front wall and the liner bottom wall adjacent the bend portion are formed shallower than in the main portion of the bottom wall section. The liner bottom wall ribs define passages having larger open cross-sectional areas than the front wall ribs for optimum venting air flow and strength to resist cargo bending stresses. The liner has border portions structured to conform with the truck bed tail gate access opening to avoid the entrance of foreign matter between the liner and truck bed while providing a custom appearance.

7 Claims, 9 Drawing Figures

TRUCK BED LINER

BACKGROUND OF THE INVENTION

This invention relates to molded plastic liners for truck cargo beds and more particularly to a one-piece protective liner for a pick-up truck or the like.

Various truck bed liners have been disclosed in prior art patents. Examples of such liners are shown in U.S. Pat. No. 4,047,749 to Lambitz, et al., issued Sept. 13, 1977 and U.S. Pat. No. 4,111,481 to Nix, et al., issued Sept. 5, 1978. One problem with prior art truck liners concerns preventing moisture retention between the liner and the truck bed to reduce rusting and corrosion. Truck beds are particularly damaged by crevice corrosion which develops in localized areas because of small volumes of stagnant water trapped in surface depressions or corrugation troughs such as by clumps of mud. The condition is worsened where portions of the metal are covered such as by a truck bed liner.

A frequent trouble spot with prior art truck liners molded in one-piece is their lack of strength in critical bend and sidewall areas where impacting cargo may shorten the liner service life.

Another problem encountered in prior art molded truck bed liners is their inability to maintain proper conformance of the liner with the truck bed when heated since the plastic material has a tendency to distort causing the liner walls to develop bows or waves.

A further concern is providing a close fit between the truck bed and liner, such as the access opening corner areas, to prevent the entrance of water and dirt and to provide an aesthetically pleasing appearance.

It is thus an object of the present invention to provide a unitary molded truck liner having high strength for rugged durability while reducing moisture retention between the liner and the truck bed to minimize corrosion.

It is another object of the present invention to provide a one-piece truck bed liner having a ribbed construction that strengthens critical cargo impact areas while providing resistance to temperature induced distortion forces.

SUMMARY OF THE INVENTION

The protective liner of the present invention includes a molded one-piece construction having a generally box-shaped configuration adapted to be nested in a truck cargo bed. The liner side walls are molded in simulated shingle-like form to provide a plurality of substantially continuous longitudinally extending stepped panels. Each of the panels includes an upwardly inclined riser portion terminating in a tread portion extending laterally from the upper terminus of its riser portion. The juncture of the panel riser and tread portions define a longitudinally extending substantially continuous side rail to resist longitudinal bending stresses which may occur when the liner is exposed to high temperatures. In addition, the side rails serve to absorb impact and frictional forces during the loading and transporting of cargo.

The liner bottom wall and front wall, integrally connected by a transverse bend portion, are in ribbed form of inverted U-shaped rib segments extending substantially throughout the length of the liner bottom wall, and the height of the liner front wall. The bend portion is free of rib segments and is separated from the bottom wall ribbed section by a transition step-down tangent rib section. This feature enables cargo to be supported on the liner bottom wall ribs and in contact with the front wall ribs while being maintained in spaced non-contacting relation to the transverse bend portion. The reduced or shallower bottom wall ribs adjacent the transverse bend portion thus prevent the corners of cargo from gauging or damaging the bend portion because the corners of such cargo cannot engage the bend portion due to the unique rib design.

It is another feature of the present invention to have the side wall stepped panels stop short of the rearward access opening of the liner to define vertical and horizontally extending border portions having corner fillets which closely conform with the truck bed corners. A customized liner is thus provided that minimizes the collection of moisture and dirt between the liner and the truck bed.

A further feature of the present invention resides in a stepped construction formed at the uppermost part of the liner front wall. This stepped construction permits the liner to match each top rail formation of the various truck manufacturers so that the liner closely fits any conventional truck cargo bed.

These and other objects and advantages of the invention will become apparent, upon reading the following description of which the attached drawings form a part.

DESCRIPTION OF THE PREFERRED EMBODIMENT

Figure 1:
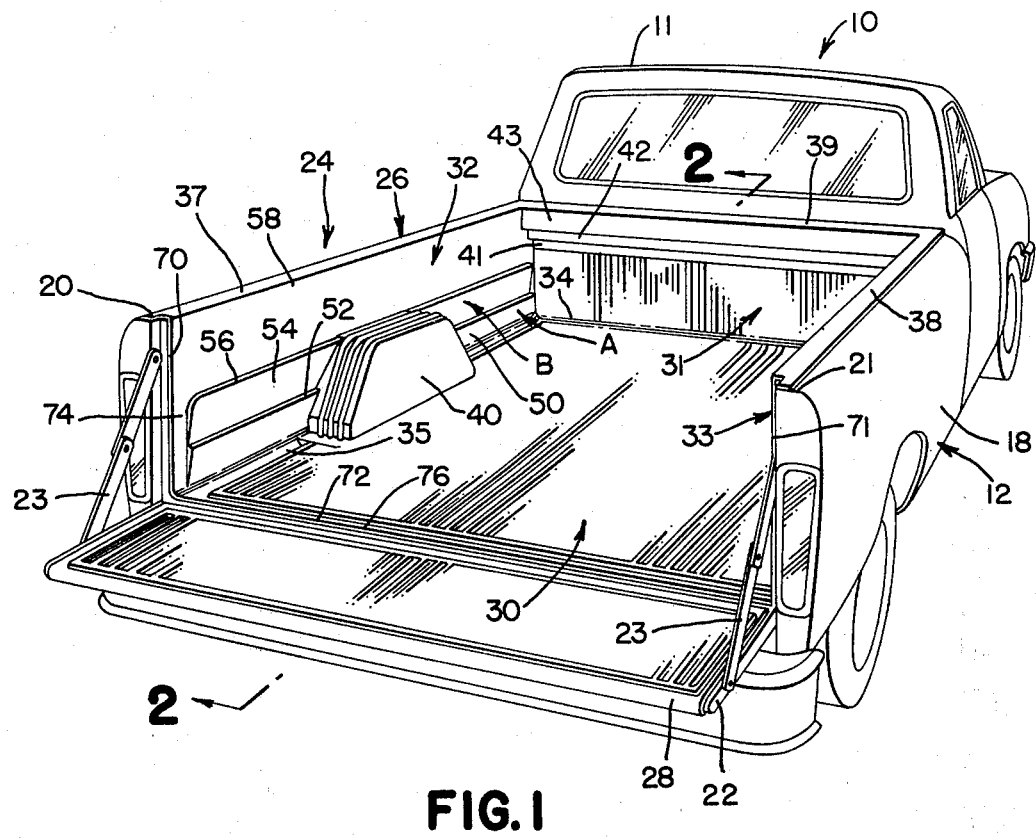
FIG. 1 is a perspective view of a pick-up truck showing the truck bed liner of the present invention mounted within the bed of the truck.
Figure 4:
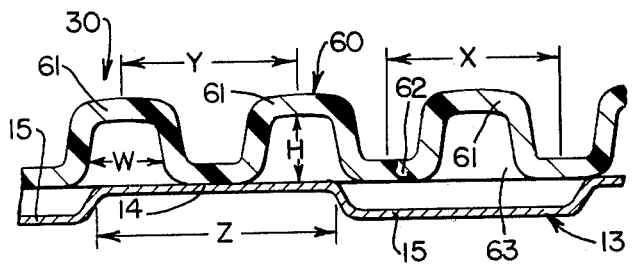
FIG. 4 is a fragmentary vertical sectional view taken substantially on line 4—4 of FIG. 3.

Referring now to the drawings, FIG. 1 discloses a conventional pick-up truck 10, including a cab 11 and a truck bed or cargo compartment 12. Cargo bed 12 includes a bottom wall or floor 13 comprising elongated inverted channels 14 and troughs 15 as seen in FIG. 4. The truck bed further includes a front wall 16, a left-hand side wall 17 and a right hand side wall 18, with the front and side walls 16, 17 and 18 having top rail or ledge portions 19, 20 and 21, respectively. A tail gate 22, pivotally mounted for swinging movement about a horizontal axis, is shown in its open position, supported by toggle link bar assemblies 23.

Figure 2:
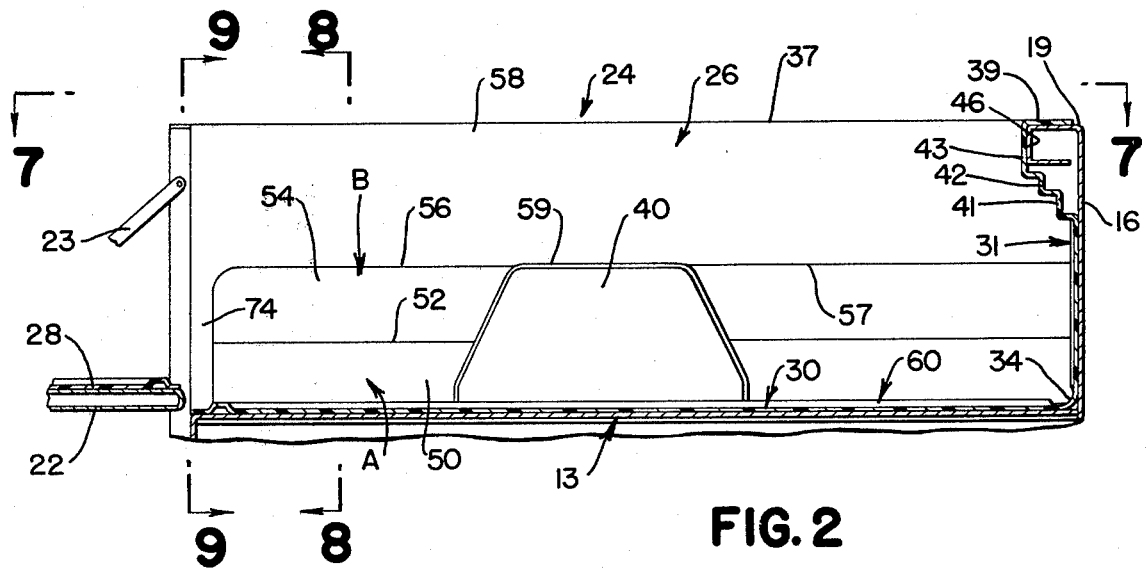
FIG. 2 is a vertical sectional view taken substantially on the line 2—2 of FIG. 1 showing the left-hand side wall portion of the truck bed liner.
Figure 8:
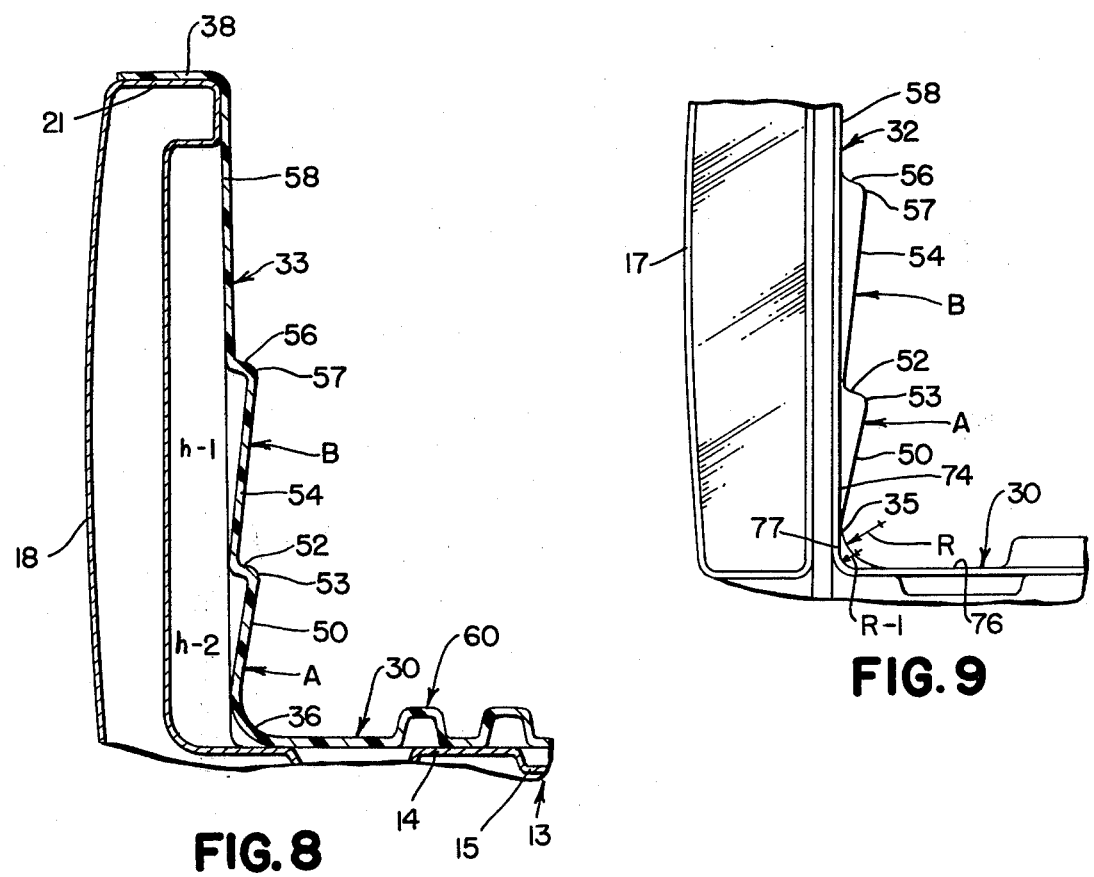
FIG. 8 is a vertical sectional view taken substantially on the line 8—8 of FIG. 2 showing details of the liner bottom wall and side wall.

As best seen in FIGS. 1, 2 and 8, a truck bed liner is indicated generally at 24 and comprises a unitary or one-piece molded body liner 26, inserted or nested in the truck bed, and a unitary molded tail gate liner 28. The tail gate liner is secured in a suitable manner on the inner wall of the tail gate 22.

The truck body liner 26 is shown comprising a bottom wall 30, a front wall 31 and opposed left-hand side wall 32 and right-hand side wall 33. The plastic box-like liner 26 is preferably formed of a continuous plastic sheet having a thermoformed average wall thickness of the order of five millimeters of a polyethylene plastic material.

FIG. 2 shows the body liner 26 including a transverse bend portion 34 connecting the liner front wall 31 with the liner bottom wall 30. Longitudinally extending bend portions are formed at 35 and at 36, connecting the left-hand and right-hand side walls 32 and 33 respectively, with the bottom wall 30. As seen in FIG. 1, the liner side walls 32 and 33 terminate in outwardly extending top flange portions 37 and 38 respectively, while the front wall 31 terminates in a forwardly extending top flange portion 39. As best seen in FIG. 8 for flange 37, the side and front wall top flange portions are of an extent to completely cover and protect the upper ledge or rail portions of the truck bed side and front walls.

Side wall 32 has a universal well 40 enclosing a wheel well on the left-hand side of the pick-up truck. An identical well is provided on the liner right-hand side wall 33 for the truck right-hand wheel well which is not shown in the drawings.

As best seen in FIG. 2, the liner front wall 31 is formed at its uppermost portion with a first stepped angle portion 41 and a second stepped angle portion 42 of substantially uniform section with the stepped angle portion 42 integrally joined by a third angle portion 43 to the front wall top flange portion 39. The stepped angle portions 41, 42, and 43 at the top of the liner front wall 31 permits the liner to match each top rail formation of the various truck manufacturers such that the liner 26 closely fits any conventional truck cargo box or bed. Thus, the largest angle portion 43 accommodates a maximum return flange portion 46 of the front rail while the angle portions 42 and 41 are arranged to receive optional flange shapes.

As the liner 26 is substantially symmetrical about its longitudinal median plane the liner side walls are formed in opposed mirror image relation. Accordingly, only the left-hand side wall 32 is detailed in the drawings.

FIG. 8 shows the side wall 32 having a unique steplike or simulated shingle form comprising a plurality of longitudinally extending substantially continuous wedge-shaped stepped panels. In the disclosed embodiment each stepped panel, such as the lowermost panel "A", includes an upwardly and inwardly inclined riser portion 50, integral with bend portion 36, and an angularly disposed tread portion 52. The tread portion 52 preferably extends outwardly at substantially a right angle from the upper terminus of its associated riser portion 50 with the juncture of the riser and tread portions defining a longitudinally extending substantially continuous side rail 53 of "rope-rib" shape.

In a similar manner, the next adjacent or upper panel "B" comprises an upwardly and inwardly inclined riser portion 54, integral with tread portion 52, and an angularly disposed tread portion 56 extending outwardly from the upper terminus of its associated riser portion 54. The panels "A" and "B" are substantially identical with the exception that panel "B" riser portion 54 has a height h1 of about 14 centimeters while the panel "A" riser portion has a height h2 of about 10 centimeters.

The juncture of the riser portion 54 and the tread portion 56 define an upper side rail 57 which, as seen in FIG. 1, extends substantially continuously in a horizontal manner throughout the longitudinal extent of left-hand side wall 32. While in the disclosed embodiment of the present invention only stepped panels "A" and "B" are disclosed it is understood that additional panels could be provided on the side walls. The side wall 32 terminates in an upper planar wall portion 58 which extends in a substantially vertical manner from the "B" panel tread portion 56 to the upper flange portion 38 overlapping the truck top rail 21.

In the construction described above, the stepped panels "A" and "B" provide the liner side wall 32 with strength to resist longitudinal bending stresses tending to warp or deform the side wall about a vertical axis. The stepped panels, including their side rails 53 and 57, also provide strength to resist shearing or impact stresses preventing high temperature induced forces from bowing the side walls in a wave-like manner.

The stepped wall panel design of the present invention permits limited bending of the side wall 32 about a longitudinal axis from its top flange to its lower bend portion 35. The design permits the side wall to flex and absorb cargo impact forces. Further the design accommodates for small variations in the vertical height between the truck top rail 21 and the bottom wall 13 of the cargo box enabling flush lapped contact of flange 37 with the top ledge 21. FIGS. 1 and 2 show the side rail 57 having its tread portion 56 substantially coextensive with the top portion 59 of the left-hand well 40. The co-planar relationship of the panel tread portion 56 and the well top 59 contribute to the lateral flexibility of the liner side wall 32 to absorb the cargo impact forces. The juncture of riser 56 and the planar wall portion 58 provide uninterrupted hinge-like flexure of the planar wall portion 58. Thus, the side wall flange 37 is free to flex in lapped conformity with the top truck rail 21 providing flush contact therebetween for maximum protection of the top rail surface together with a finished appearance of the liner.

A feature of the liner resides in side rails 53 and 57 acting as protective fender-like portions reducing liner wear. The truck bed side rails 53 and 57, of rope-rib shape, provide line contact engagement with cargo being loaded and transported minimizing frictional wear on the liner side walls. The angled side rails 53 and 57 also serve as integral structural gussets or spars to resist liner distortion.

Figure 3:
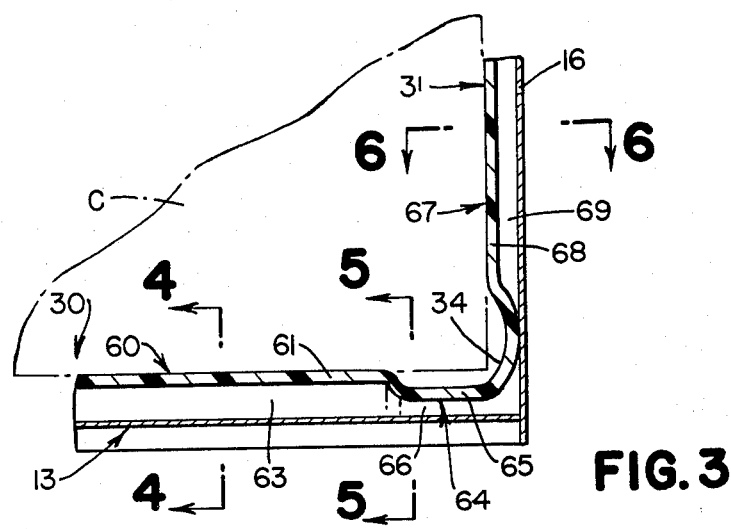
FIG. 3 is an enlarged fragmentary cross-sectional view of the transverse bend portion of the liner and the associated truck bed bottom and side walls.
Figure 5:
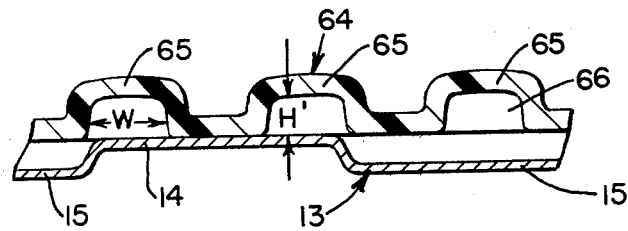
FIG. 5 is a vertical sectional view taken substantially on the line 5—5 of FIG. 3.
Figure 6:
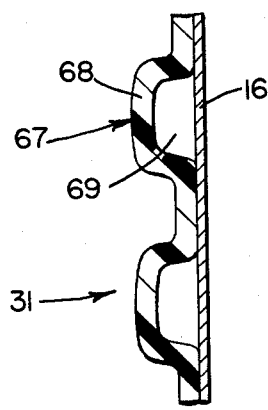
FIG. 6 is a vertical sectional view taken substantially on the line 6—6 of FIG. 3.
Figure 7:
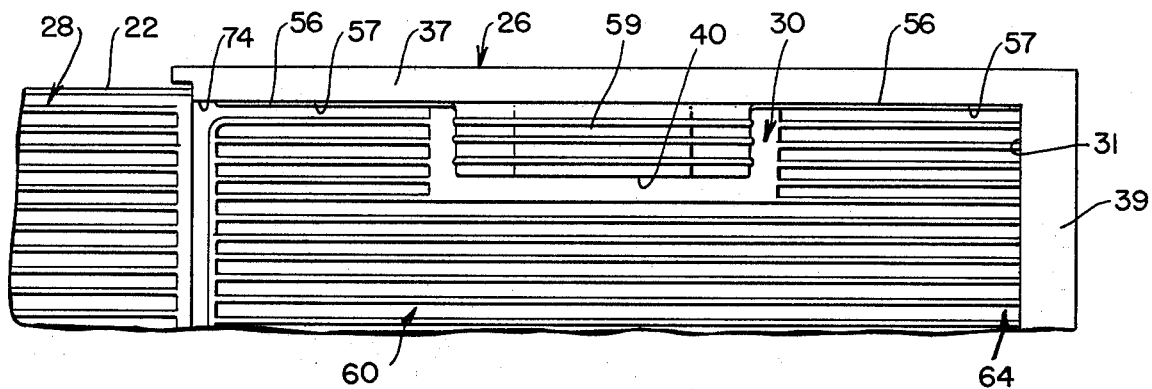
FIG. 7 is a fragmentary, top plan view of the left-hand portion of the truck bed liner disclosed in FIG. 1.

FIGS. 3 and 4 include ribbed section 60, terminating at the liner forward end in reduced colinear ribbed tangent section 64 (FIG. 5) defining a stepdown transition between the ribbed section 60 and the bend portion (FIG. 6). The ribbed sections 60, 64 and 67 define a plurality of rib segments 61, 65 and 68 respectively, located in a given longitudinally extending vertical plane. The given plane thus defines a first bottom wall rib segment 61, a second bottom wall step-down tangent rib segment 65 and a third front wall vertical rib segment 68. Thus, as seen in FIG. 3 each of the tangent and vertical rib segments 65 and 68 respectively, extend to the transverse bend portion 34 free of rib segments.

FIG. 4 shows the bottom wall rib section 60 including a plurality of adjacent inverted U-shaped ribs 61 separated by furrows 62 extending in a continuous manner substantially throughout the length of the liner bottom wall 30. The inverted U-shaped ribs 61 define longitudinally extending passages 63 each having an open cross-sectional area wherein the passage height "H" and the width "W" are of substantially equal dimension. In the disclosed form, "H" and "W" are both of the order of 12 millimeters to define substantially square sectioned ribs. This arrangement together with the liner thickness, about 5 millimeters in the form shown, provides strength enabling the bottom wall to resist cargo bending stresses.

As seen in FIG. 4, each of the truck bed liner troughs 15 is in open communication with at least one rib passage 63 insuring optimum venting air flow between the truck floor 13 and the liner bottom wall 30 to obviate moisture accumulation in the truck bed. The rib section 60 is designed with hat-shaped ribs having an overall width dimension "X" substantially equal to the dimension "Y" between adjacent ribs 61. The dimensions "X" and "Y" are each a predetermined distance less than the width "Z" of an inverted floor channel 14 to provide the above-mentioned open communication between liner bottom wall passages 63 and troughs 15. In the form shown, the dimension "Z" for most truck bed inverted channels 14 is typically about 40 millimeters while the substantially equal dimensions "X" and "Y" are of about 30 millimeters, i.e., "X" and "Y" are about three-quarters of the distance "Z".

With reference to FIG. 5, it will be seen that the lower bottom wall or step-down tangent rib section 64 has inverted U-shaped or hat-shaped rib segments 65 equal in their width dimension "W" with rib segments or ribs 61. The ribs 65 define passages 66 with a height "H'" of the order of 6 millimeters or approximately one-half the height "H" of the passages 63 formed by the ribs 61 in the liner bottom wall 30. FIG. 6 shows the liner front wall 31 rib section 67 identical to the tangent rib section 64 with the vertically extending inverted U-shaped ribs 68 defining venting air and water flow passages 69 aligned with passages 66 and 63.

FIG. 3 shows the rib section 60 stopping short of the transverse bend portion 34, defining therebetween the liner bottom wall step-down tangent rib section 64 providing a transition between the rib section 60 and the transverse bend portion 34 resulting in a clearance space between cargo, indicated by phantom lines at "C", and the transverse bend portion 34. Cargo supported on the bottom wall rib segments 61 and in juxtaposed relation to the front wall rib segments 68 will be maintained in spaced non-impacting relation to the bend portion 34. This construction, namely the reduced or shallower bottom wall rib segments 65 adjacent bend portion 34, prevents the corners of cargo from gauging or damaging the bend portion because the corners of such cargo cannot engage the bend portion due to the unique rib design.

Figure 9:
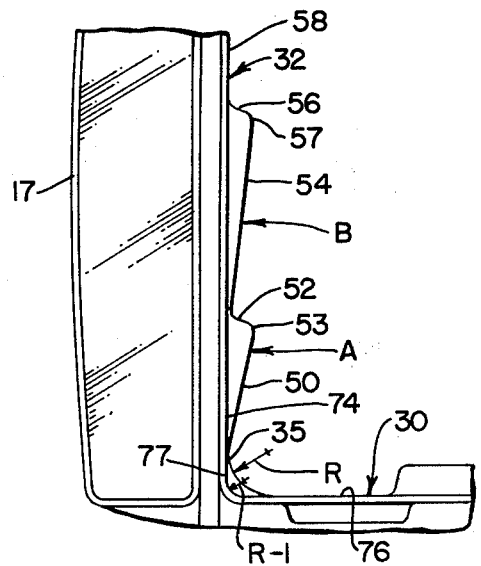
FIG. 9 is an enlarged fragmentary elevational view, taken on line 9—9 of FIG. 2, of the corner juncture at the left-hand side wall and bottom wall of the liner.

Turning now to FIG. 9, another feature of the present invention involves the arrangement wherein the stepped panels "A" and "B" of the side walls stop short of the rear edges 70 and 71 of the side walls 32 and 33 respectively, and the edge 72 of the liner bottom wall 30. FIG. 9 shows the bend portion 35 formed with a first radius "R" of a predetermined dimension sufficient to allow the side and bottom walls to adjust to variations in height of the truck bed side walls 17 and 18.

FIGS. 1 and 9 show the rearward access opening of the liner being defined by vertically extending left hand border portion 74 for the liner side walls 32 and a horizontal transversely extending border portion 76 of the liner bottom wall. The border portion 74 defines a liner left-hand fillet 77 having a predetermined radius of curvature "R-1" which is substantially less than the bend portion radius of curvature "R" permitting the fillet 77 to closely conform with the truck bed corner. The importance of this corner construction not only provides a custom appearance to the protective liner, but substantially reduces the amount of foreign material and moisture that may enter between the liner and the truck bed bottom and side walls.

It will be apparent to those skilled in the art that the foregoing disclosure is explanatory in nature rather than limiting, the invention being limited only by the appended claims.

I claim:

1. A protective liner for a truck bed structure having a floor, a front wall, and opposed side walls, the truck side walls and floor forming a rearward access opening, said liner comprising:
   a molded plastic one-piece liner member adapted to be inserted in the truck bed, said liner member having a bottom wall, a front wall, and opposed side walls;
   longitudinally extending bend portions connecting each said liner side wall with said liner bottom wall;
   each said liner side wall being in simulated shingle form including a plurality of longitudinally extending substantially continuous stepped panels,
   each panel including an upwardly and inwardly inclined riser portion and an angularly disposed tread portion extending outwardly from the upper terminus of its associated riser portion, the juncture of each panel riser and tread portion defining a longitudinally extending substantially continuous side rail;
   said liner side walls characterized in that the stepped panels providing strength to resist longitudinal bending stresses while the longitudinally extending panel side rails being operative to absorb cargo impact and frictional forces;
   said liner side walls and bottom wall defining a rearward substantially rectangular opening providing access for receiving material to be transported;
   said liner bottom wall being in ribbed form, including a plurality of longitudinally extending adjacent inverted U-shaped ribs, said ribs extending rearwardly to a bottom wall border portion free of said ribs;
   said stepped panels extending rearwardly to side wall border portions free of said stepped panels;
   each side wall lowermost riser portion having its lower terminus integral with its associated longitudinally extending bend portion;
   said longitudinally extending bend portions having a predetermined radius of curvature;
   said liner side wall border portions joined to said bottom wall border portion by fillet portions having a predetermined radius of curvature substantially less than said bend portions radius of curvature, whereby said border fillet portions closely conform with their associated truck bed access opening corners obviating the entrance of foreign matter between the liner and the truck bed.

2. A protective liner for a truck bed structure having a floor, a front wall, and opposed side walls, the truck side walls and floor forming a rearward access opening, said liner comprising:

a molded plastic one-piece liner member adapted to be inserted in the truck bed, said liner member having a bottom wall, a front wall, and opposed side walls;

longitudinally extending bend portions connecting each said liner side wall with said liner bottom wall;

each said liner side wall being in simulated shingle form including a plurality of longitudinally extending substantially continuous stepped panels, each panel including an upwardly and inwardly inclined riser portion and an angularly disposed tread portion extending outwardly from the upper terminus of its associated riser portion, the juncture of each panel riser and tread portion defining a longitudinally extending substantially continuous side rail;

said liner side walls characterized in that the stepped panels providing strength to resist longitudinal bending stresses while the longitudinally extending panel side rails being operative to absorb cargo impact and frictional forces;

said liner bottom wall and front wall integrally joined by a transverse bend portion;

said liner bottom wall, and front wall being in ribbed form including a plurality of closely adjacent inverted U-shaped ribs;

each said rib located in a given longitudinally extending vertical plane defining a first bottom wall rib segment, a second bottom wall step-down tangent rib segment and a third front wall rib segment;

said liner second and third rib segments stopping short of said transverse bend portion;

said second and third rib segments defining passages having predetermined equal open cross-sectional areas;

the arrangement characterized in each said first bottom wall rib segment passage cross-sectional area substantially greater than each said second and third rib segment cross-sectional areas providing optimum venting air and fluid flow between the liner bottom wall and the truck bed floor.

3. The protective liner as set forth in claim 2, with the truck bed front wall upper end having a ledge formed with a return bend flange extending rearwardly from the truck bed front wall, wherein:

said liner front wall upper end terminating in a series of rearwardly and upwardly extending steps formed for receiving various return bend flange shapes enabling the liner to conform in a universal manner to a plurality of cargo bed front wall designs.

4. A protective liner for a truck bed structure having a floor, a front wall, and opposed side walls, the truck bed side walls and floor forming a rearward cargo access opening, said liner comprising:

a molded plastic one-piece liner member adapted to be inserted in the truck bed, said liner member having a bottom wall, a front wall, and opposed side walls;

longitudinally extending bend portions connecting each said liner side wall with said liner bottom wall, said liner bottom wall and front wall integrally joined by a transverse bend portion;

each said liner side wall being in simulated shingle form including a plurality of longitudinally extending substantially continuous stepped panels, such that each panel defines a longitudinally extending substantially continuous side rail;

said liner side walls characterized in that said side wall stepped panels provide strength to resist longitudinal bending stresses while the longitudinally extending panel side rails being operative to absorb cargo impact and frictional forces;

said liner bottom wall and front wall being in ribbed form, including a plurality of longitudinally extending adjacent inverted U-shaped ribs;

each said inverted U-shaped rib located in a given longitudinally extending vertical plane defining a first bottom wall rib segment, a second bottom wall tangent rib segment, and a third front wall rib segment;

each said liner bottom wall first rib segment having a height greater than each said second and third rib segments;

each said second and third rib segments extending to said transverse bend portion free of rib segments, whereby cargo supported on said bottom wall first rib segments and contacting said third front wall rib segments having the corners of each cargo maintained in spaced, non-contacting relation to said transverse bend portion.

5. A protective liner for a truck bed structure having a floor, a front wall, and opposed side walls, the truck bed side walls and floor forming a rearward access opening, said liner comprising:

a molded plastic one-piece liner member adapted to be inserted in the truck bed, said liner member having a bottom wall, a front wall, and opposed side walls;

longitudinally extending bend portions connecting each said liner side wall with said liner bottom wall;

each said liner side wall being in simulated shingle form including a plurality of longitudinally extending continuous stepped panels such that each panel defines a longitudinally extending continuous side rail;

said liner characterized in that said side wall stepped panels provide strength to resist longitudinal bending stresses while the longitudinally extending continuous panel side rails being operative to absorb cargo impact and frictional forces;

said liner side walls and bottom wall including rearward end border portions defining an opening providing an access for receiving material to be transported;

the stepped panels extending to said side wall border portions free of the stepped panels;

the lowermost riser portion of each liner side wall having its lower terminus integral with its associated longitudinally extending bend portion;

said longitudinally extending bend portions having a predetermined radius of curvature; and said liner side wall and bottom wall border portions joined by border fillet portions having a predetermined radius of curvature substantially less than said bend portions radius of curvature, whereby said border fillet portions closely conform with their associated truck bed access opening corners obviating the entrance of foreign matter between the liner and the truck bed.

6. A protective liner for a truck bed structure having a floor, a front wall, opposed side walls, wheel wells on each truck bed sidewall and top ledges at the upper edge of each bed side wall, the truck bed side walls and floor forming a rearward access opening, said liner comprising:

a molded plastic one-piece liner member adapted to be inserted in the truck bed, said liner member having a bottom wall, a front wall, and opposed side walls;

longitudinally extending bend portions connecting each said liner side wall with said liner bottom wall;

each said liner side wall being in simulated shingle form including a plurality of longitudinally extending continuous stepped panels, each stepped panel defining a longitudinally extending continuous side rail;

said liner side walls characterized in that the stepped panels providing strength to resist longitudinal bending stresses while the longitudinally extending continuous panel side rails being operative to absorb cargo impact and frictional forces;

each said stepped panel including an upwardly and inwardly inclined riser portion and an angularly disposed tread portion extending outwardly from the upper terminus of its associated riser portion, the juncture of each panel riser and tread portion defining its longitudinally extending continuous side rail;

longitudinally extending bend portions connecting each liner side wall with said liner bottom wall;

each said liner side wall having a well for receiving the associated truck bed wheel well;

each said liner side wall having its uppermost stepped panel formed with its tread portion in substantial coincidence with the top of its associated well;

a flange portion extending outwardly from the upper terminus of each said liner side wall overlying its associated truck bed top ledge;

each liner side wall tread portion defining a flexing juncture permitting limited bending of the side wall compensating for differential spacing between a truck bed top ledge and floor.

7. The protective liner as set forth in claim 6, with the truck bed front wall having a top ledge formed with a return bend flange extending rearwardly from the truck bed front wall, wherein:

said liner front wall upper end terminating in a series of rearwardly and upwardly extending steps formed for receiving the return bend flange shapes.

* * * * *